Aug. 23, 1966  R. L. MURRAY ETAL  3,268,202
VALVE CONSTRUCTION OR THE LIKE
Filed May 27, 1963  2 Sheets-Sheet 1
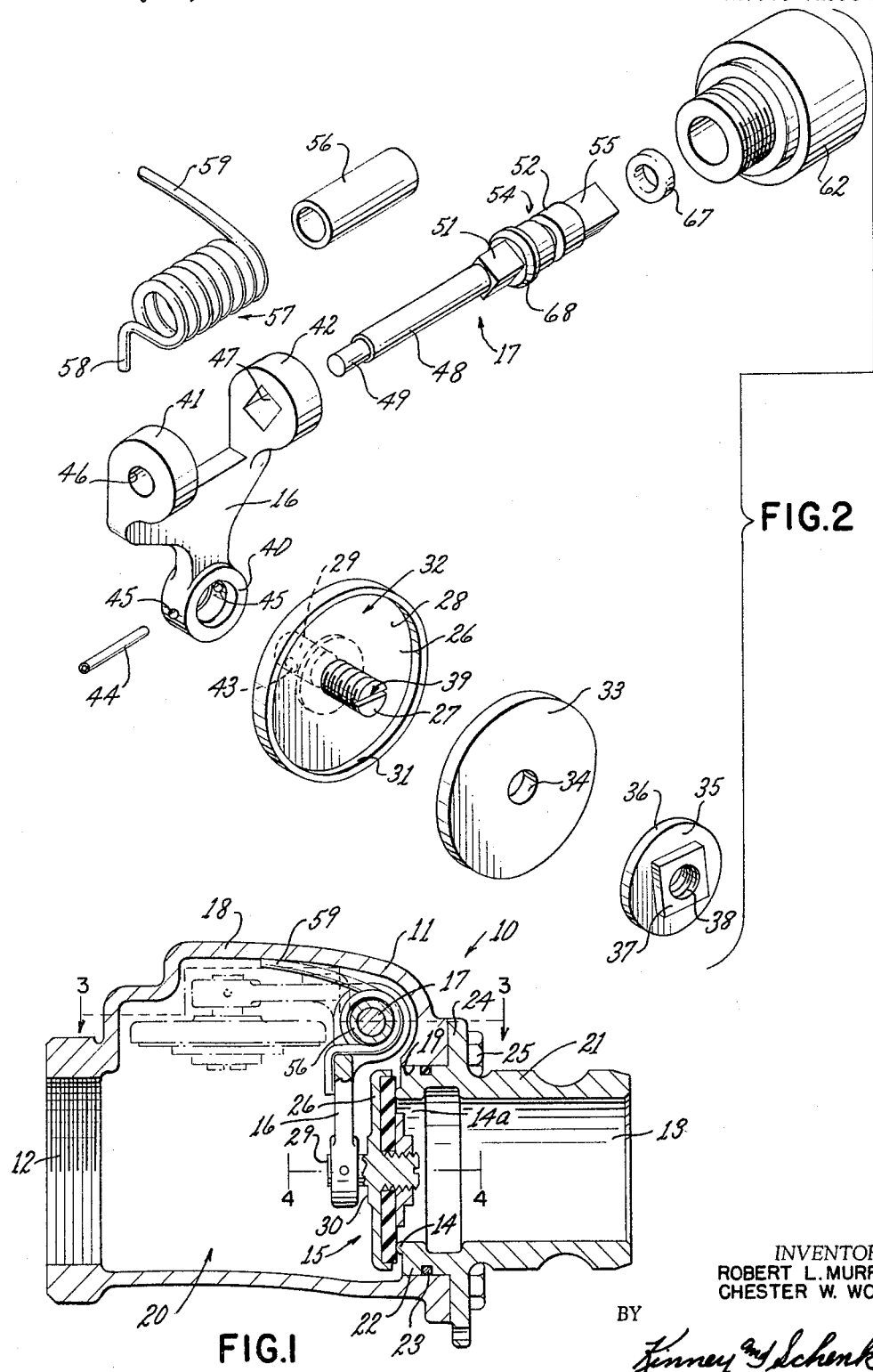
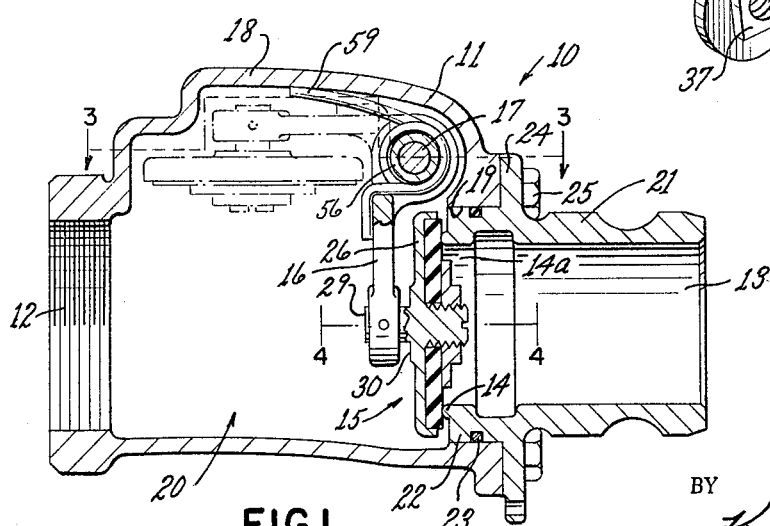
INVENTORS
ROBERT L. MURRAY
CHESTER W. WOOD
BY
*Kinney and Schenk*
ATTORNEYS 3,268,202
VALVE CONSTRUCTION OR THE LIKE
Robert L. Murray, Dayton, Ky., and Chester W. Wood, Cincinnati, Ohio, assignors to Dover Corporation, Cincinnati, Ohio, a corporation of Delaware
Filed May 27, 1963, Ser. No. 283,323
1 Claim. (Cl. 251—86)

This invention relates to an improved valve construction as well as to improved parts for such a valve construction or the like.

It is well known in the art to provide a carrier-type of valve means for selectively opening and closing a valve opening defined by a valve seat disposed between the inlet and the outlet of a housing, such valve means being readily usable for dispensing gasoline from gasoline storage trucks or the like.

Such prior known carrier-type valve means normally comprise a valve member having a carrier pin or shaft-like member projecting centrally outwardly from the non-seating side thereof to be operatively interconnected to one end of a carrier arm that has the other end thereof pivotally connected to the housing so that pivotal movement of the carrier arm about its pivot connection by either manual or automatic means, causes the valve member to move relative to the valve seat, such carrier arm normally being urged to its valve closing position by a coiled spring or the like.

In such prior known carrier-type of valve means, a washer-like member is telescoped over the carrier pin or shaft-like member of the valve member and is disposed between the carrier arm and the valve member to transmit the force of movement of the carrier arm to the valve member to cause the same to seat against the valve seat of the housing. Such motion transmitting washer normally has a diametrically disposed rib on one side thereof and another diametrically disposed rib on the other side thereof which is disposed substantially perpendicular to the first-named rib whereby the ribs transmit the force of movement of the carrier arm to the valve member to cause seating thereof.

Because such prior known motion-transmitting washer of the above-mentioned carrier-type valve means is readily rotatable relative to the carrier arm and valve member, it has been found that the same does not uniformly transmit the force of movement of the carrier arm to the valve member whereby the valve member does not seat around the entire periphery of the valve seat and, thus, provides a source of adverse leakage.

In addition, such prior known motion-transmitting washer does not transmit the force of movement of the carrier arm through the center of the valve member whereby the failure of the valve member to seat completely around the periphery of the valve seat is aggravated.

However, according to the teachings of this invention, an improved valve construction is provided wherein a carrier-type of valve means can be utilized and the same will seat substantially 360° around the periphery of the valve seat to eliminate the above leakage problem of the prior known carrier-type of valve means.

In particular, this invention provides an improved carrier-type of valve means wherein the force of movement of the carrier arm is transmitted substantially centrally through the valve member to cause the valve member to seat substantially 360° around the periphery of the valve seat to completely eliminate fluid leakage at the valve seat when the valve member is disposed in its closed position.

In addition, this invention provides unique means for attaching the valve member to the carrier arm so that the valve member is substantially universally carried by the carrier arm and, thus, is adapted to seek its own position relative to the carrier arm when seating against the valve seat of the housing. In this manner, close manufacturing tolerances need not be maintained when forming a valve construction according to the teachings of this invention in order to have the advantages of this invention wherein the valve member will seat substantially 360° about the periphery of the valve seat to prevent fluid leakage.

Thus, it can be seen that the valve construction of this invention is very economical to manufacture while providing improved results over prior known valve constructions.

Accordingly, it is an object of this invention to provide an improved valve construction having one or more of the novel features of this invention as set forth above or hereinafter shown or described.

Another object of this invention is to provide improved parts for such a valve construction or the like.

Other objects, uses and advantages of this invention are apparent from a reading of this description which proceeds with reference to the accompanying drawings forming a part thereof and wherein:

FIGURE 1 is a cross-sectional view illustrating the improved valve construction of this invention.

FIGURE 2 is an exploded perspective view illustrating certain of the parts of the valve construction of FIGURE 1.

Figure 3:
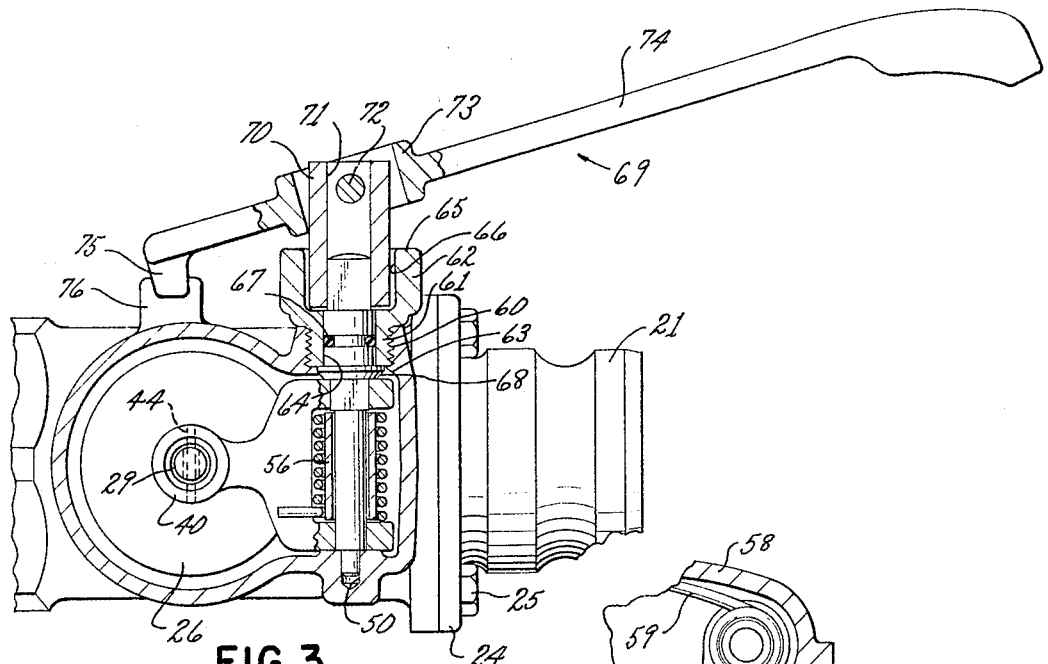
FIGURE 3 is a cross-sectional view of the valve construction illustrated in FIGURE 1 and is taken on line 3—3 of FIGURE 1, FIGURE 3 illustrating the valve member in its fully opened position.

While the various features of this invention are hereinafter described and illustrated as being particularly adaptable for forming a carrier-type of valve construction, it is to be understood that the various features of this invention can be utilized singly or in any combination thereof to provide other types of valve constructions or the like.

Therefore, this invention is not to be limited to only the embodiment illustrated in the drawings, because the drawings are merely utilized to illustrate one of the wide variety of uses of this invention.

Referring now to FIGURE 1, the improved valve construction of this invention is generally indicated by the reference numeral 10 and comprises a housing 11 having an inlet 12 and an outlet 13 separated from each other by a valve seat 14 that defines a valve opening 14a that is selectively opened and closed by a valve member 15 of this invention in a manner hereinafter described.

The valve member 15 of this invention is uniquely interconnected, in a manner hereinafter described, to a carrier arm 16 pivotally mounted to the housing 11 by a shaft 17 in a manner hereinafter described whereby rotational movement of the shaft 17 in a clockwise direction in FIGURE 1 causes the valve member 15 to move to its fully opened position as illustrated by dotted lines in FIGURE 1 to fully interconnect the inlet 12 of the housing 11 with the outlet 13 whereby fluid can flow past the valve seat 14 and through the opening 14a.

Conversely, when the shaft 17 is rotated in a counter-clockwise direction as illustrated in FIGURE 1, the carrier arm 16 moves the valve member 15 to its closed position as illustrated by full lines in FIGURE 1 to completely close the inlet 12 from the outlet 13, the valve member 15 substantially seating 360° about the periphery of the valve seat 14 in a manner hereinafter described to prevent fluid leakage at the valve seat 14 regardless of the position of the valve seat 14 relative to the carrier arm 16 as will be apparent hereinafter.

Therefore, it can be seen that the valve construction 10 of this invention is relatively simple and comprises a few basic parts whereby the same can be economically made while still providing the advantages of this invention as set forth above and hereinafter described, such advantages not being obtainable in prior known carrier-type of valve constructions.

The particular details of the valve construction 10 of this invention will now be described.

As illustrated in FIGURE 1, the housing 11 of the valve construction 10 of this invention comprises a first part 18 interrupted at one end by the inlet 12 and at the other end by a bore 19, the bore 19 and inlet 12 leading to a compartment 20 in the housing part 18 which permits movement of the valve member 15 between its opened and closed positions.

The housing 11 of the valve construction 10 of this invention includes another housing part 21 having the valve seat 14 at one end thereof and the outlet 13 at the other end thereof, the housing part 21 having a substantially cylindrical portion 22 adapted to be telescopically received in the bore 19 of the housing part 18 and be sealed therein by a suitable O-ring or gasket 23 carried by the housing part 21. The housing part 21 is adapted to have the portion 22 thereof telescoped into the bore 19 of the housing part 18 until an outwardly directed flange 24 of the housing part 21 abuts against the housing part 18 in the manner illustrated in FIGURE 1.

Thereafter, the housing parts 18 and 21 can be detachably secured together by a plurality of bolts 25 or other fastening members as desired.

Therefore, it can be seen that the housing 11 of the valve construction 10 of this invention is relatively simple and can be formed of any suitable material and in any suitable manner. In addition, should part of the valve member 15 need replacing, the housing part 21 can be readily removed to provide easy access to the valve member 15 as will be apparent hereinafter.

As illustrated in FIGURES 1 and 2, the valve member 15 of this invention includes a substantially circular carrier plate 26 having an integral, threaded projection 27 extending centrally outwardly from one side 28 thereof and a substantially cylindrical and integral carrier pin or shaft-like member 29 extending centrally outwardly from the other side 30 thereof for a purpose hereinafter described.

The carrier plate 26 of the valve member 15 of this invention has an outwardly extending peripheral flange 31 cooperating with the side 28 of the plate 26 to define a compartment 32 that is adapted to receive a disc-like resilient member 33 having an aperture 34 passing centrally therethrough to telescopically receive the threaded projection 27 in the manner illustrated in FIGURE 1.

After the resilient member 33 has been assembled in the compartment 32 of the carrier plate 26, a retainer nut 35 is utilized to detachably secure the resilient member 33 in place, the carrier nut 35 comprising a disc-like plate portion 36 and a nut-like portion 37 integrally interconnected together and having a threaded bore 38 passing centrally therethrough to threadedly receive the threaded projection 27 of the carrier plate 26.

To assist in the initial assembling of the retainer 35, resilient member 33 and carrier plate 26 together, the threaded projection 27 of the carrier plate 26 can be bifurcated at 39 to provide means for receiving the end of a screw driver or the like to hold the carrier plate 26 from rotation while the retainer 35 is being threaded on the projection 27 to tighten the resilient member 33 in place.

Therefore, it can be seen that the resilient member 33 provides a resilient surface for seating against the valve seat 14 in the manner illustrated in FIGURE 1.

The carrier arm 16 of the valve construction 10 of this invention has a substantially cylindrical portion 40 at one end thereof and a pair of transversely disposed lugs or ears 41 and 42 at the other end thereof.

The cylindrical portion 40 of the carrier arm 16 is adapted to telescopically receive the carrier pin 29 of the valve member 15 in the manner illustrated in FIGURES 4 and 5, the carrier pin 29 being loosely received in the telescoping portion 40 of the carrier arm 16 for a purpose hereinafter described.

Figure 4:
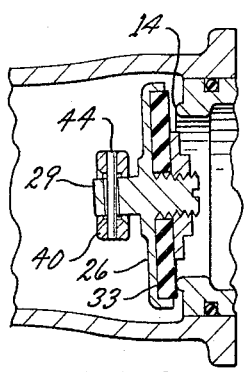
FIGURE 4 is a fragmentary, cross-sectional view taken substantially on line 4—4 of FIGURE 1.

The carrier pin or shaft-like member 29 of the valve member 15 has a bore 43 passing transversely and centrally therethrough in the manner illustrated in FIGURES 2 and 4 to loosely receive a pin 44 carried by the telescoping portion 40 of the carrier arm 16 and being retained in suitable bores 45 formed in the telescoping portion 40 in the manner illustrated in FIGURE 2.

For example, the pin 44 can be hollow and be longitudinally split so that the same can be expanded by any suitable means at the opposed ends thereof in the bores 45 of the telescoping portion 40 of the carrier arm 16 to retain the same to the carrier arm 16. However, it is to be understood that the pin 44 can be secured to the carrier arm 16 in any other suitable manner.

Therefore, it can be seen that the carrier arm 16 is operatively interconnected to the valve member 15 by the pin 44 in such a manner that the valve member 15 is substantially universally attached to the carrier arm 16.

Figure 5:
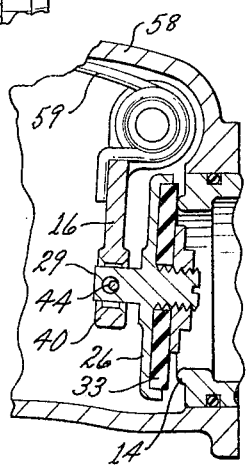
FIGURE 5 is a fragmentary, cross-sectional view similar to FIGURE 1 with certain of the elevation parts of FIGURE 1 shown in cross section in FIGURE 5.

In particular, because the carrier pin or shaft-like member 29 of the valve member 15 is loosely received in the cylindrical portion 40 of the carrier arm 16, the valve member 15 is adapted to move relative to the carrier arm 16 in the manner illustrated in FIGURE 5 so that if the valve seat 14 is out of alignment with the fixed movement of the carrier arm 16, the valve member 15 can seek its own level relative to the valve seat to cause the same to completely seat 360° around the valve seat 14.

Similarly, because the pin 44 is loosely received in the bore 43 of the carrier pin or shaft-like member 29 of the valve member 15, the valve member 15 is adapted to move relative to the pin 44 in the manner illustrated in FIGURE 4 to seek its own level relative to the valve seat 14 should the valve seat 14 be out of alignment with the fixed pivotal movement of the carrier arm 16.

Thus, because of the looseness between the telescoping portion 40 and the carrier pin 29 as well as the looseness between the pin 44 and the bore 43 of the carrier pin 29, the valve member 15 is substantially universally attached to the carrier arm 16 so that the valve member 15 can seek its own level relative to the valve seat 14 to seat substantially 360° around the valve seat 14 whereby the tolerances between the valve seat 14 and the pivotal movement of the carrier arm 16 need not be tightly controlled. In this manner, unskilled labor can be utilized whereby the manufacturing costs of the valve construction 10 of this invention are relatively low while still providing a superior valve construction 10.

In addition, the looseness between the carrier pin 29 and the telescoping portion 40 of the carrier arm 16 and the looseness between the pin 44 and the bore 43 of the carrier pin 29 are not too great whereby the amount of cocking of the valve member 15 relative to the carrier arm 16 is limited by the construction to prevent the valve member 15 from cocking into the valve seat 14 during closing movement of the valve member 15.

Further, since the bore 43 in the carrier pin 29 of the valve member 15 of this invention crosses the center of the valve member 15, the pin 44 of the carrier arm 16 is adapted to transmit the force of movement of the carrier arm 16 directly through the center of the valve member 15 to cause the valve member 15 to seat substantially 360° about the periphery of the valve seat 15 to prevent fluid leakage therebetween when the valve member 15 is moved to the closed position by the carrier arm 16 in a manner hereinafter described.

Thus, it can be seen that a unique attaching means is provided between the carrier arm 16 and the valve member 15 to not only universally attach the valve member 15 to the carrier arm 16 but to also permit the force of movement of carrier arm 16 to be transmitted through the center of the valve member 15 whereby the valve member 15 will seat substantially 360° about the periphery of the valve seat 14, the center of the valve member 15 substantially coinciding with the center of the valve seat 14 when the valve member 15 is moved to the closed position as illustrated in FIGURE 1.

The ear or lug 41 of the carrier arm 16 is provided with a cylindrical bore 46 passing therethrough while the ear or lug 42 of the carrier arm 16 is provided with a substantially rectangular or square bore 47 passing therethrough for a purpose now to be described.

As illustrated in FIGURES 2 and 3, the shaft 17 includes a cylindrical portion 48 adapted to be telescopically received in the cylindrical bore 46 of the ear 41 in the manner illustrated in FIGURE 3 and has a pin-like portion 49 projecting outwardly from the cylindrical portion 48 to be received in a closed bore 50 formed in the housing 11 in the manner illustrated in FIGURE 3, the pin-like portion 49 being rotatable relative to the bore 50 of the housing 11 for a purpose hereinafter described.

The shaft 17 has a rectangular or square portion 51 at the other end of the cylindrical portion 48 and is adapted to be complementally received in the square bore 47 of the ear 42 in the manner illustrated in FIGURE 3 whereby the shaft 17 is keyed to the carrier arm 16 to cause pivotal movement thereof upon rotation of the shaft 17 in a manner hereinafter described.

A cylindrical portion 52 of the shaft 17 is disposed outboard of the square portion 51 thereof and is interrupted to provide an annular groove 54 for a purpose hereinafter described.

A square or rectangular portion 55 of the shaft 17 is disposed outboard of the cylindrical portion 52 thereof and is utilized as the means for rotating the shaft 17 relative to the housing 11 in a manner hereinafter described to selectively open and close the valve member 15 in the manner previously described.

During the assembly operation of the shaft 17 to the carrier arm 16, a cylindrical sleeve 56, FIGURES 2 and 3, is adapted to be disposed between the lugs 41 and 42 of the carrier arm 16 and telescopically receive the cylindrical portion 48 of the shaft 17, the sleeve 58 having a coiled spring 57 disposed around the same in the manner illustrated in FIGURE 3.

The coiled spring 57 has one end 58 thereof adapted to be disposed against the carrier arm 16 in the manner illustrated in FIGURE 3 and has the other end 59 thereof adapted to be disposed against the housing 11 in the manner illustrated in FIGURE 1, whereby the coiled spring 59 tends to rotate the shaft 17 in a counterclockwise direction in FIGURE 1 to tend to maintain the valve member 15 in its closed position against the valve seat 14 in the manner previously described.

However, when the shaft 17 is rotated in a clockwise direction in a manner hereinafter described, the carrier arm 16 is moved to the dotted line position illustrated in FIGURE 1 in opposition to the force of the spring 57 to open the valve member 15 whereby the spring 57 is adapted to automatically close the valve member 15 against the valve seat 14 when the restraining force is removed from the shaft 17.

The shaft 17 is adapted to project outwardly through a threaded bore 60, FIGURE 3, formed in the housing 11, the threaded bore 60 of the housing 11 threadedly receiving a threaded portion 61 of a retainer 62 in the manner illustrated in FIGURE 3.

The retainer 62 has one end 63 thereof interrupted by a cylindrical bore 64 adapted to telescopically receive part of the cylindrical portion 52 of the shaft 17 in the manner illustrated in FIGURE 3, the other end 65 of the retainer 62 being interrupted by a larger bore 66 concentric with the bore 64 for a purpose hereinafter described whereby the rectangular or square portion 55 of the shaft 17 is disposed in the bore 66 of the retainer 62 and is protected from accidental rotation thereof by the retainer 62.

In order to permit rotational movement of the shaft 17 relative to the retainer 62 while still providing a sealing relationship therebetween, a suitable flexible O-ring 67 or the like is disposed in the recess 54 of the cylindrical portion 52 of the shaft 17 in the manner illustrated in FIGURE 3.

In order to secure the shaft 17 in the housing 11 of the valve construction 10 of this invention, a shoulder 68, FIGURES 2 and 3, is provided on the shaft 17 in the manner illustrated in FIGURE 3 to prevent the shaft 17 from being moved upwardly in FIGURE 3 relative to the housing 11. The shoulder 68 is adapted to abut against the retainer 62 in the manner illustrated in FIGURE 3.

Therefore, it can be seen that the entire valve construction 10 of this invention can be formed of a relatively few simple parts adapted to be readily assembled together in an economical manner whereby the overall cost of the valve construction 10 of this invention is relatively low while still providing a carrier-type valve means that will seat substantially 360° about the valve seat to prevent fluid leakage even though there is misalignment of the various parts.

While the shaft 17 can be operated in any suitable manner to open and close the valve member 15 in the manner previously described, one such means is to utilize a tool 69 illustrated in FIGURE 3.

The tool 69 includes a retainer 70 having a substantially square or rectangular bore 71 passing therethrough which is adapted to telescopically and complementary receive the square portion 55 of the shaft 17 in the manner illustrated in FIGURE 3, the retainer 70 being pivotally mounted by a shaft 72 to a telescoping portion 73 of the tool 69 whereby the handle portion 74 of the tool 69 can be pivoted relative to the retainer 70.

In order to open the valve member 15 of the valve construction 10 of this invention against the bias of the spring 57, the user merely inserts the retainer 70 over the portion 55 of the shaft 17 in the manner illustrated in FIGURE 3 and, with the handle 74 disposed substantially horizontally in FIGURE 3, rotates the shaft 17 by movement of the handle 74 in the proper direction until the valve member 15 has been moved to its fully opened position as illustrated by full lines in FIGURE 3 and by dotted lines in FIGURE 1.

Thereafter, the user raises upwardly on the handle portion 74 to the full line position illustrated in FIGURE 3 whereby a tang 75 of the handle 74 is adapted to be disposed behind an outwardly extending abutment 76 formed on the housing 11. In this manner, the valve member 15 can be held in the opened position because the force of the spring 57 tending to close the valve member 15 holds the tang 75 of the handle 74 against the abutment 76 of the housing 11 whereby the tool 69 cannot be rotated in a direction to close the valve member 15.

Thereafter, when it is desired to close the valve member 15, the user merely grasps the handle 74 and pulls downwardly on the same until the handle 74 is disposed substantially horizontally in FIGURE 3 whereby the tang 75 is now raised above the abutment 76 and the handle 74 can be rotated in the proper direction by the force of the spring 57 to close the valve member 15 in the manner previously described.

Therefore, it can be seen that it is relatively simple to operate the valve construction 10 of this invention by the tool 69 or by any other suitable shaft rotating means.

Should it be desired to replace the resilient member 33 of the valve member 15, the housing part 21 can be removed and a suitable wrench or the like can be inserted in the bore 19 of the housing part 18 to unthread the retaining nut 35 without requiring means to hold the valve member 15 from rotation because the valve member 15 is held from rotation by the carrier arm 16. Thus, it is a relatively easy operation to repair the valve member 15 of this invention.

Accordingly, this invention provides an improved valve construction having many novel features over the prior art as well as many advantages heretofore unobtainable in prior known valve constructions.

Further, this invention provides improved parts for such a valve construction or the like.

While the form of the invention now preferred has been disclosed as required by statute, other forms may be used, all coming within the scope of the claimed subject matter which follows.

What is claimed is:

In a valve structure, a housing comprising a first part and a second part, said first part having an inlet opening, said first part further having a bore opening thereinto and axially aligned with said inlet opening, said housing second part being tubular and having an open end telescopically received in said bore and forming an outlet from the housing, said open end of said second housing part being defined by a valve seat, means removably securing said housing second part to said first part, a rotatable shaft carried by the housing first part adjacent to said open end of said second part, an arm carried by said shaft for swinging movement relative to said valve seat, said arm terminating in a cylindrical body having an axial bore of a certain diameter and having a width in the axial direction materially greater than the thickness of the arm, the arm being radial to the cylindrical body, said cylindrical body having a radial bore perpendicular to the longitudinal axis of the arm, a valve member comprising a plate having a stud projecting from the center of one face thereof and having a carrier pin projecting from the center of the opposite face, said pin extending through said axial bore of said body and having a diameter materially less than the axial bore, said pin having a radial bore aligned with and of a diameter materially greater than said body radial bore, a coupling pin materially smaller in diameter than and extending through the radial bore of the first mentioned pin and having its ends fixed in the body radial bore, a resilient member positioned against said one face of said plate for seating engagement with said valve seat, said resilient member having a diameter less than the diameter of said bore of the first housing part, means removably securing the resilient member to said plate, said valve member being substantially universally freely movable relative to said arm whereby full 360° seating engagement of said resilient member with said valve seat is assured, means for turning said shaft, and said resilient member being removable from said plate through said bore of said housing second part following withdrawal of said open end of said housing second part from the last said bore.

References Cited by the Examiner

UNITED STATES PATENTS

| | | | |
|---|---|---|---|
| 1,156,326 | 10/1915 | Stiers | 251—298 |
| 1,284,063 | 11/1918 | Davis et al. | 251—86 |
| 1,725,428 | 8/1929 | Tilden | 251—303 X |
| 1,777,580 | 10/1930 | Russell | 251—87 X |
| 1,799,667 | 4/1931 | Ziegler | 251—87 |
| 2,965,116 | 12/1960 | Boone et al. | 251—86 X |

M. CARY NELSON, *Primary Examiner.*

A. ROSENTHAL, *Assistant Examiner.*